E. I. NOTTINGHAM.
WATERING DEVICE FOR CATTLE.
APPLICATION FILED AUG. 4, 1917.
1,283,274.
Patented Oct. 29, 1918.
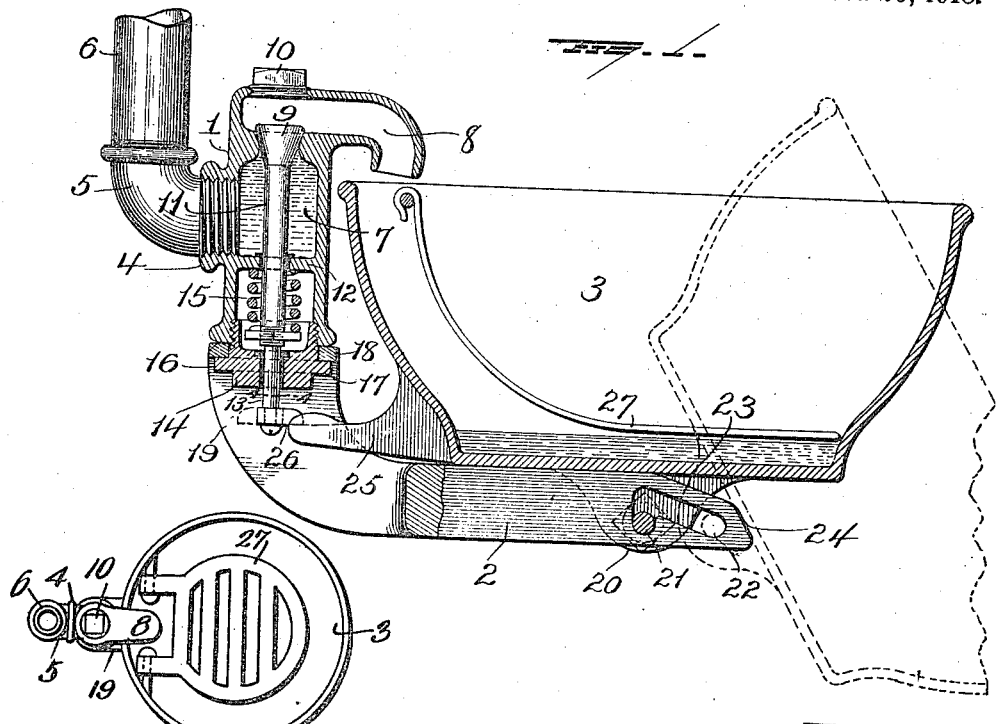
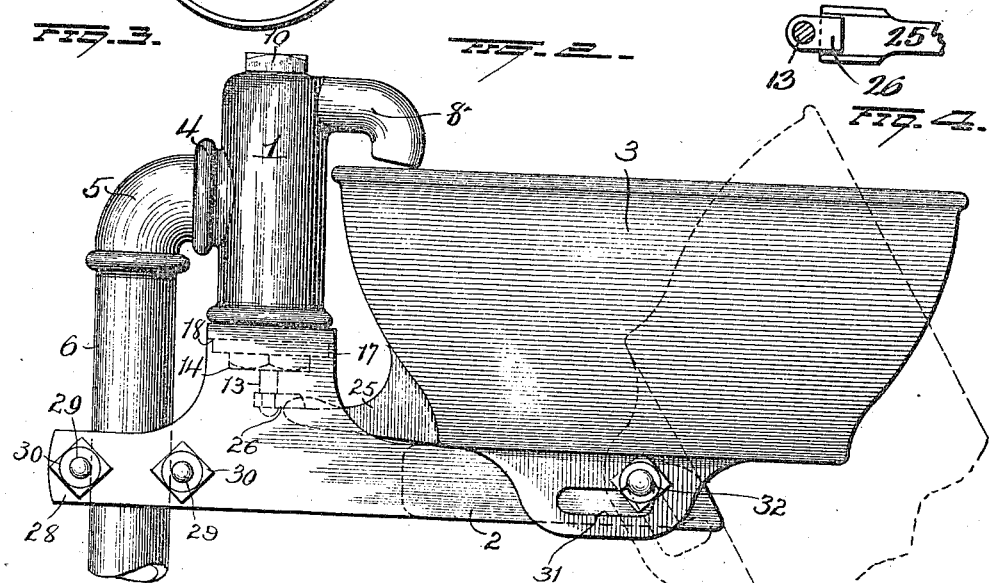
WITNESSES
INVENTOR

UNITED STATES PATENT OFFICE.

EDWIN I. NOTTINGHAM, OF WASHINGTON, DISTRICT OF COLUMBIA, ASSIGNOR TO HUGO C. RASSMANN, OF BEAVER DAM, WISCONSIN.

WATERING DEVICE FOR CATTLE.

1,283,274.  Specification of Letters Patent.  Patented Oct. 29, 1918.

Application filed August 4, 1917. Serial No. 184,500.

*To all whom it may concern:*

Be it known that I, EDWIN I. NOTTINGHAM, a citizen of the United States, and a resident of Washington, in the District of Columbia, have invented certain new and useful Improvements in Watering Devices for Cattle; and I do hereby declare the following to be a full, clear, and exact description of the invention, such as will enable others skilled in the art to which it appertains to make and use the same.

This invention relates to improvements in watering devices for cattle,—one object of the invention being to provide a structure of this type which may be readily cleaned and in which the water supply to the bowl shall be under the control of the animal, but be operable by movement of the bowl itself, whereby lever mechanism to be operated by the animal may be dispensed with.

A further object is to improve and simplify animal operated watering devices of the type to which my invention relates.

With these and other objects in view, the invention consists in certain novel features of construction and combinations of parts as hereinafter set forth and pointed out in the claims.

The accompanying drawings Figure 1 is a sectional view of a watering device embodying my improvements; Fig. 2 is a view in side elevation of a modification; Fig. 3 is a plan view of the structure shown in Fig. 1, and Fig. 4 is a detail sectional view on the line 4—4 of Fig. 1.

1 represents a fount provided with an arm 2 on which a bowl 3 is supported. The fount 1 is provided with a nipple 4 for the attachment of a suitable pipe coupling 5 to which water is conveyed by a pipe 6 from any suitable source of supply. The coupling 5 may be so disposed as to receive the pipe 6 from above as in Fig. 1, or said coupling may be arranged to receive the pipe 6 coming from below, as in Fig. 2. The nipple 4 or the pipe coupling 5 which is screwed thereinto communicates with a chamber 7 in the fount and the passage of water from this chamber to a spout 8 which discharges the water into the bowl, is controlled by means of a valve 9, to which access may be had through an opening in the top of the fount,—said opening being normally closed by means of a plug 10. The stem 11 of the valve 9 is guided through a partition 12 in the fount casing and at its lower end is provided with a shank 13 passing freely through a nut 14 screwed into the bottom of the fount casing. A spring 15 encircles the valve stem and bears at one end against the partition 12,—the other end of said spring bearing against a collar 16 adjustably mounted on the valve stem 11. The spring 15 thus acts to retain the valve 9 normally closed.

The nut 14 is provided with a flange 17 and between this flange and the lower end of the fount casing, a ring 18 at the upper end of the vertical portion 19 of arm 2 is disposed,—the arm 2 being thus rigidly secured to and, in effect, constituting a part of the fount structure.

The bowl 3 may, when in a horizontal position, rest upon the arm 2 and it is provided with lugs 20 which carry a pivot pin 21. The forward portion of the arm 2 is provided with an L-shaped slot 22 which receives the pivot pin 21. Normally, the pin 21 is disposed at the bottom of the short vertical portion of the slot 22 and said arm 2 is beveled as at 23 so that the bowl may be tilted on its pivotal support for a limited distance and said arm is also beveled as at 24 so that the bowl may be tilted sufficiently when the pivot pin is at the far end of the slot 22 to permit the bowl to be emptied and easily cleaned.

The bowl 3 is provided with an arm 25 adapted to engage under a lug 26 attached to the lower end of the shank 13 of valve stem 11 so that when the bowl is tilted by the animal in the act of drinking, motion will be transmitted to the valve 9 and thus permit water to flow into the bowl from the spout 8.

In order to compel the animal to drink from the portion nearest him, a guard 27 may be mounted in the bowl as shown. After the animals have learned to drink from the forward portion of the bowl where pressure on this portion of the bowl will cause the latter to be readily tilted to operate the valve, the guard 27 may be removed.

It will be seen that the pin and slot construction above described will hold the bowl locked in its normal operative position and that by raising the bowl slightly so as to move the pin 21 out of the vertical portion of the slot and then moving the bowl forwardly, the latter can be tilted to the position shown in dotted lines.

It may sometimes happen that it may not be desirable to permit the animal to operate the valve which supplies the water to the bowl. In this event the finger 26 on the lower end of the shank of the valve stem, may be swung or turned to the dotted line position shown in Fig. 1.

In Fig. 2 I have shown the arm 2 provided with fingers or extensions 28, between which the upwardly projecting water supply pipe 6 passes, the said extension being clamped to said pipe by the bolts 29 and nuts 30. With this construction part of the weight of the bowl and the strains thereon are borne by the supply pipe. Again instead of providing the arm 2 with a slot, and the lugs on the underside of the bowl with a pin, as in Fig. 1, the lugs may be provided with slots 31, and the arm 2 with a pin 32 the ends of which enter the slots, and support the bowl.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:

1. The combination with a valved fount provided with a horizontally disposed arm, of a bowl located over and mounted to rest in a horizontal position upon said arm and having pivotal connection therewith such that it normally rests upon the arm whether full or empty, said bowl having a part to coöperate with the valve of the fount to open the same when the bowl is tilted by the animal.

2. The combination with a valved fount provided with a horizontally disposed arm, of a bowl located over and mounted to rest in a horizontal position upon said arm and having a pivotal connection therewith such that it normally rests upon the arm whether full or empty, said bowl having a part to coöperate with the valve of the fount to open the same when the bowl is tilted by the animal, and means to limit such tilting movement of the bowl.

3. In a watering device, the combination with a valved fount provided with a horizontally disposed bowl support, of a bowl mounted upon said support and provided with a part to coöperate with the valve stem of the valved fount and having pin and slot connection with the fount to permit sliding of the bowl to disengage said part on the bowl from the valve stem and also to permit pivotal movement of the bowl relatively to said support.

4. In a watering device, the combination with a valved fount provided with an arm disposed horizontally, said arm having an approximately L-shaped slot, of a bowl disposed over said arm and provided with a part to engage the valve stem of the valved fount and having a pivot pin mounted in said slot, whereby the bowl may be tilted or moved horizontally and then swung downwardly.

5. In a watering device, the combination with a valved fount and a bowl support beveled at one end and having an approximately L-shaped slot adjacent to said beveled portion, of a bowl over said support and adapted to receive water from said fount, a pivot pin carried by the bowl and mounted in said slot, and a part rigid with said bowl and adapted to coöperate with the valve of the fount to open the same when the bowl is tilted.

6. In a watering device, the combination with a valved fount, of an arm rigidly secured at one end to said fount and projecting horizontally therefrom, a bowl mounted upon said arm to slide, an arm on said bowl adapted normally to engage the valve of the fount, and a pin-and-slot connection between the bowl and the horizontal arm, whereby the bowl may be moved out of operative relation to the valve of the fount and then tilted to empty the contents of the bowl.

7. In a watering device, the combination with a fount provided with a valve, and a horizontal bowl support, of a bowl mounted upon said support and pivotally connected therewith, an arm rigid with the bowl, and a lug connected with the stem of the valve of the fount to be engaged by the bowl arm, said lug on the valve stem being movable out of engagement with the bowl arm.

8. In a watering device, the combination with a fount, of an arm for supporting a bowl, a nut securing said arm to the casing of the fount, a valve in said fount having a stem projecting through said nut, a lug on said stem, a bowl pivotally mounted on said arm, and an arm on the bowl to engage the lug on the valve stem.

9. In a watering device, the combination of a valved fount and a pivoted bowl to receive water therefrom, said bowl having a part to coöperate with the valve of the fount to open the same when the bowl is tilted, and a guard disposed within the bowl, said guard having a part disposed over the bottom of the bowl and a part projecting upwardly within the bowl in rear of the pivotal support of the bowl.

In testimony whereof, I have signed this specification in the presence of two subscribing witnesses.

EDWIN I. NOTTINGHAM.

Witnesses:
G. F. DOWNING,
S. G. NOTTINGHAM.